(12) United States Patent
Tirumalai et al.

(10) Patent No.: US 7,681,188 B1
(45) Date of Patent: Mar. 16, 2010

(54) LOCKED PREFETCH SCHEDULING IN GENERAL CYCLIC REGIONS

(75) Inventors: Partha P. Tirumalai, Fremont, CA (US); Spiros Kalogeropulos, Los Gatos, CA (US); Yonghong Song, South San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1179 days.

(21) Appl. No.: 11/117,977

(22) Filed: Apr. 29, 2005

(51) Int. Cl.
*G06F 9/45* (2006.01)
*G06F 9/26* (2006.01)
*G06F 9/30* (2006.01)

(52) U.S. Cl. .................. 717/161; 717/146; 717/152; 711/213; 712/207

(58) Field of Classification Search .............. 717/146, 717/152, 161; 711/213; 712/207
See application file for complete search history.

(56) References Cited

U.S. PATENT DOCUMENTS

| | | | | |
|---|---|---|---|---|
| 4,488,217 A * | 12/1984 | Binder et al. | ............ | 710/200 |
| 4,876,642 A * | 10/1989 | Gibson | ............ | 712/233 |
| 5,404,553 A * | 4/1995 | Komori et al. | ............ | 712/25 |
| 5,623,615 A * | 4/1997 | Salem et al. | ............ | 712/238 |
| 5,642,493 A * | 6/1997 | Burgess | ............ | 711/116 |
| 5,655,122 A * | 8/1997 | Wu | ............ | 717/152 |
| 5,704,053 A * | 12/1997 | Santhanam | ............ | 717/158 |
| 5,732,242 A * | 3/1998 | Mowry | ............ | 711/136 |
| 5,742,839 A * | 4/1998 | Suetake et al. | ............ | 712/34 |
| 5,842,225 A * | 11/1998 | Kohn | ............ | 711/202 |
| 5,918,246 A * | 6/1999 | Goodnow et al. | ............ | 711/137 |
| 5,950,007 A * | 9/1999 | Nishiyama et al. | ............ | 717/161 |
| 6,421,826 B1 * | 7/2002 | Kosche et al. | ............ | 717/161 |
| 6,832,370 B1 * | 12/2004 | Srinivasan et al. | ............ | 717/161 |
| 6,959,379 B1 * | 10/2005 | Wojcieszak et al. | ............ | 712/241 |
| 7,143,267 B2 * | 11/2006 | Fluhr et al. | ............ | 712/207 |
| 2002/0144090 A1 * | 10/2002 | Ronen et al. | ............ | 712/217 |
| 2004/0268085 A1 * | 12/2004 | Hara et al. | ............ | 711/213 |
| 2006/0179174 A1 * | 8/2006 | Bockhaus et al. | ............ | 710/22 |

OTHER PUBLICATIONS

Mowry, T. C. 1998. Tolerating latency in multiprocessors through compiler-inserted prefetching. ACM Trans. Comput. Syst. 16, 1 (Feb. 1998), 55-92. DOI= <http://doi.acm.org/10.1145/273011.273021>.*

Viji Srinivasan; Davidson, E.S.; Tyson, G.S., "A prefetch taxonomy," Computers, IEEE Transactions on , vol. 53, No. 2, pp. 126-140, Feb. 2004, URL: <http://ieeexplore.ieee.org/stamp/stamp.jsp?arnumber=1261824&isnumber=28203>.*

(Continued)

*Primary Examiner*—James Rutten
(74) *Attorney, Agent, or Firm*—Park, Vaughan & Fleming LLP; Edward J. Grundler (57) ABSTRACT

One embodiment of the present invention provides a system that facilitates locked prefetch scheduling in general cyclic regions of a computer program. The system operates by first receiving a source code for the computer program and compiling the source code into intermediate code. The system then performs a trace detection on the intermediate code. Next, the system inserts prefetch instructions and corresponding locks into the intermediate code. Finally, the system generates executable code from the intermediate code, wherein a lock for a given prefetch instruction prevents subsequent prefetches from being issued until the data value returns for the given prefetch instruction.

15 Claims, 5 Drawing Sheets

OTHER PUBLICATIONS

Malek, "An Improved Representation of Nested Cyclic Regions", Nov. 1, 1989, IBM Technical Disclosure Bulletin, Research Disclosure n307 11-89.*

Park et al., "Analyzing Instruction Prefetching Techniques via a Cache Performance Model: Effectiveness and Limitations" 19th IEEE International Performance, Computing and Communications, pp. 501-508, Feb. 2000.*

C.-K. Luk and T. C. Mowry. Compiler and hardware support for automatic instruction prefetching: a cooperative approach. Technical Report CMU-CS-98-140, Carnegie Mellon University, Jun. 1998.*

* cited by examiner

LOCKED PREFETCH SCHEDULING IN GENERAL CYCLIC REGIONS

BACKGROUND

1. Field of the Invention

The present invention relates to compilers for computer systems. More specifically, the present invention relates to a method and an apparatus for performing locked prefetch scheduling in general cyclic regions of a computer program within an optimizing compiler.

2. Related Art

Advances in semiconductor fabrication technology have given rise to dramatic increases in microprocessor clock speeds. This increase in microprocessor clock speeds has not been matched by a corresponding increase in memory access speeds. Hence, the disparity between microprocessor clock speeds and memory access speeds continues to grow, which can cause performance problems. Execution profiles for fast microprocessor systems show that a large fraction of execution time is spent not within the microprocessor core, but within memory structures outside of the microprocessor core. This means that the microprocessor systems spend a large fraction of time waiting for memory references to complete instead of performing computational operations.

In order to remedy this problem, some microprocessors provide hardware structures to facilitate prefetching of data and/or instructions from memory in advance of where the instructions and/or data are needed. Unfortunately, existing techniques typically target structured program loop constructs and rely on the computation of an "ahead" distance, which is used to control how far ahead the prefetches are of the target loads or stores.

This technique works well for many cases, but it does not have the coverage and precise control over prefetch that is needed to maximize performance. In many systems, a prefetch that is issued too early may be dropped if too many prefetches are outstanding so the system cannot accept a new prefetch request. Conversely, a prefetch that is issued too late may lead to under-utilization of the central processing unit.

Hence, what is needed is a method and an apparatus for controlling prefetches without the problems cited above.

SUMMARY

One embodiment of the present invention provides a system that facilitates locked prefetch scheduling in general cyclic regions of a computer program. The system operates by first receiving a source code for the computer program and compiling the source code into intermediate code. The system then performs a trace detection on the intermediate code. Next, the system inserts prefetch instructions and corresponding locks into the intermediate code. Finally, the system generates executable code from the intermediate code, wherein a lock for a given prefetch instruction prevents subsequent prefetches from being issued until the data value returns for the given prefetch instruction.

In a variation of this embodiment, performing the trace detection involves identifying a cyclic region of the intermediate code and gathering all accesses marked for prefetching in the cyclic region. The system then inserts locks for selected prefetch operations and then schedules the prefetches and the locks.

In a further variation, identifying the cyclic region of the intermediate code involves locating general cyclic regions in the intermediate code that have a high probability of being executed repeatedly.

In a further variation, the system performs training runs to determine a probability of a region of the intermediate code being executed repeatedly.

In a further variation, locks are inserted a specified number of prefetch instructions after a corresponding prefetch instruction has been inserted.

In a further variation, the specified number of prefetch instructions matches the number of prefetch queue slots available to hold pending prefetch operations.

In a further variation, a lock for a given prefetch instruction is implemented as a non-faulting load instruction to the same address as the given prefetch instruction.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

OVERVIEW

The large and growing disparity between processor and memory speeds is causing may programs to spend a substantial fraction of their execution times waiting for data to arrive from memory. Software prefetching as a technique where data is fetched before it is needed, thereby minimizing the amount of time waiting for data when it is actually needed. Very large gains are possible with appropriate software prefetching in today's processors. This makes improvements in software prefetching very valuable.

This invention addresses the problem of software prefetching in general cyclic regions of a program. Past techniques, which have mostly targeted structured program loop constructs, rely on the computation of an "ahead distance, which is used to control how far ahead the prefetches are of the target loads or stores. While this technique works fairly well for may cases, it does not have the coverage and precise control over prefetch needed to maximize performance. In many systems, a prefetch that is issued too early may be dropped if the system is saturated and cannot then accept a new request. Conversely, a prefetch that is issued too late can lead to under-utilization. This invention presents a new prefetch technique, which has broader applicability and finer control over prefetch to maximize utilization of available bandwidth.

Prefetching has become a high-impact area because of the growing memory latency problem in modern systems. This invention essentially changes the roles of instruction and prefetch scheduling. Accepting that memory is the bottleneck in many code regions, the system first optimizes for bandwidth utilization with locked prefetch scheduling and then works the computation schedule into the prefetch-set schedule, not the other way around. It is believed that as the gap between processor and memory increases, this view will have increasing benefit.

This invention broadens the class of code constructs that can be effectively prefetched by a compiler. It delivers greater performance by sustaining a high number of concurrent requests to memory, and it has the ability to smooth out performance variations across a family of systems that have a range of latency, bandwidth, and prefetch characteristics. In various experiments, it produced gains of up to 30% over traditional techniques.

Consider a program to be to be optimized using prefetches. The system first identifies general cyclic region in the program. These regions need not be Fortran DO loops or C for loops, or nests of such loops. In addition to these well structured loops, the system includes any sequence of instructions that has a high probability of being executed repeatedly in succession. Using information obtained from a training run, the system obtains the probability prob(i,j) of a transition from basic block i to basic block j. Then from these transition probabilities, the system identifies a cyclic region which is a circular sequence of basic blocks such that the transition probabilities between adjacent blocks in the sequence is greater than a set threshold, T. T could be 0.9, for example.

Having identified such a region, the system applies a locked prefetch scheduling technique to it as follows. Using one or more of the following means:

static reuse analysis in the compiler,
  cache miss information gathered from a training run, and/ or
  programmer inserted hints in the source, the system identifies the loads Ll and stores Ss in the cyclic region that are likely to suffer cache misses. Then, the system combines the two sets into a sequence of accesses Aa that follow the order of likely cache misses in the region. Let the sequence Aa have k accesses in it. For each access, the system tries to compute the address function $f(Ax, p, d)$ which describes how to compute the address used by access Ax in the dth future execution of the cyclic region given the address p in the current execution. In a simple case, this function might just involve a multiply by a constant and an add or subtract. But it can be more complex and involve other operations including the ALU and loads. If there are loads, the system makes them non-faulting. If the address function cannot be computed, or if the computation involves recursion, the system uses a simple guess function that adds d*c to the address p, where c is a constant (e.g. c could be the cache line size).

Locked prefetch scheduling then inserts a prefetch and a lock for each of the k elements in the identified access sequence Aa. Let N be the maximum number of memory requests that can be outstanding in the system. Let the k prefetches be numbered P(0) through P(k−1) and L(i) be the lock for prefetch P(i). The lock L(i) for prefetch P(i) is placed immediately before prefetch P(j) where j=(i+N) mod k. It is possible that i=j. Next, the distance d between such a prefetch and its lock is computed as floor (N/k) if i<=j and ceiling (N/k) if i>j. Knowing this distance, the address to be used for the lock can be derived using the address function computed earlier for the access targeted by the P(i), L(i) pair. In this scheme, locks are implemented as non-faulting loads whose destination is either a reserved register or a preset (all zero/ read only) register that many architectures provide.

Various experiments have been conducted using locked prefetch scheduling. On available systems, locked prefetch scheduling was able to sustain a high number of concurrently outstanding requests to memory and thus increase utilization of available bandwidth. Performance gains of up to 30% were observed on at least one family of systems. It is believed that the gains would be even higher on system possessing more bandwidth. Moreover, the gains were high for the difficult cases involving large regions with numerous prefetch candidates because these cases were inadequately handled by previously implemented schemes.

Computer System

Figure 1:
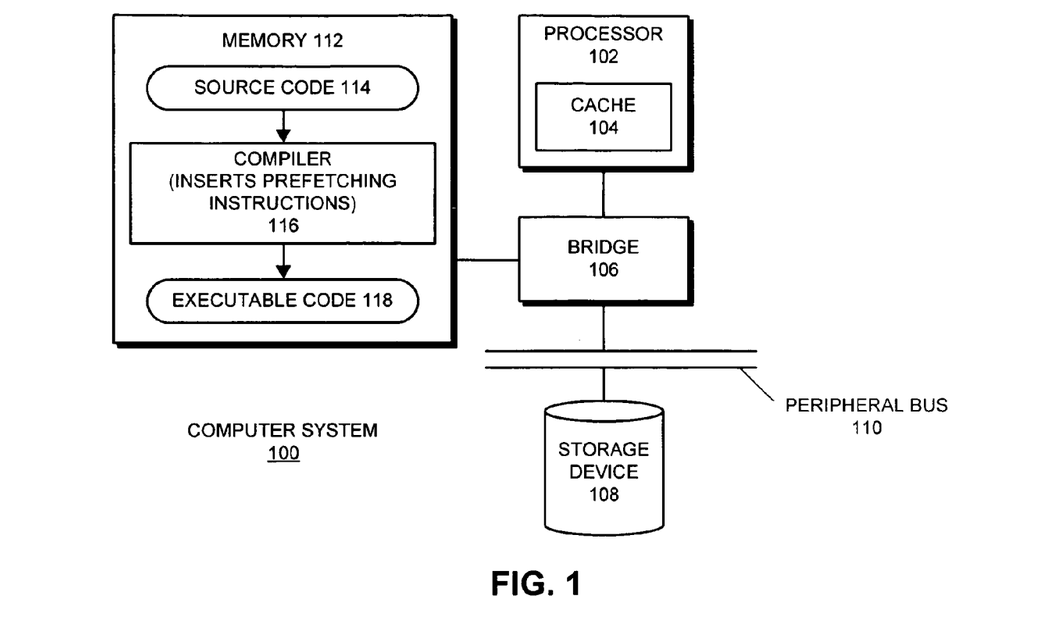
FIG. 1 illustrates a computer system in accordance with an embodiment of the present invention.

FIG. 1 illustrates a computer system 100 in accordance with an embodiment of the present invention. As illustrated in FIG. 1, computer system 100 includes processor 102, which is coupled to a memory 112 and to peripheral bus 110 through bridge 106. Bridge 106 can generally include any type of circuitry for coupling components of computer system 100 together.

Processor 102 can include any type of processor, including, but not limited to, a microprocessor, a mainframe computer, a digital signal processor, a personal organizer, a device controller and a computational engine within an appliance. Processor 102 includes a cache 104 that stores code and data for execution by processor 102.

Note that the effect of a prefetch operation is to cause a cache line to be retrieved from memory 112 into cache 104 before processor 102 accesses the cache line. Note that many computer systems employ both a level-two (L2) cache as well as a level-one (L1) cache. In this type of computer system, a prefetch operation can cause a cache line to be pulled into L2 cache as well as L1 cache. Note that all of the following discussion relating to prefetching an L1 cache line applies to prefetching an L2 cache line. Furthermore, note that the present invention can also be applied to computer systems with more than two levels of caches.

Processor 102 communicates with storage device 108 through bridge 106 and peripheral bus 110. Storage device 108 can include any type of non-volatile storage device that can be coupled to a computer system. This includes, but is not limited to, magnetic, optical, and magneto-optical storage devices, as well as storage devices based on flash memory and/or battery-backed up memory.

Processor 102 communicates with memory 112 through bridge 106. Memory 112 can include any type of memory that can store code and data for execution by processor 102.

As illustrated in FIG. 1, memory 112 contains compiler 116. Compiler 116 converts source code 114 into executable code 118. In doing so, compiler 116 inserts explicit prefetch instructions into executable code 118 as is described in more detail below with reference to FIGS. 2-8.

Note that although the present invention is described in the context of computer system 100 illustrated in FIG. 1, the present invention can generally operate on any type of computing device that can accommodate explicit prefetch instructions. Hence, the present invention is not limited to the specific computer system 100 illustrated in FIG. 1.

Compiler

Figure 2:
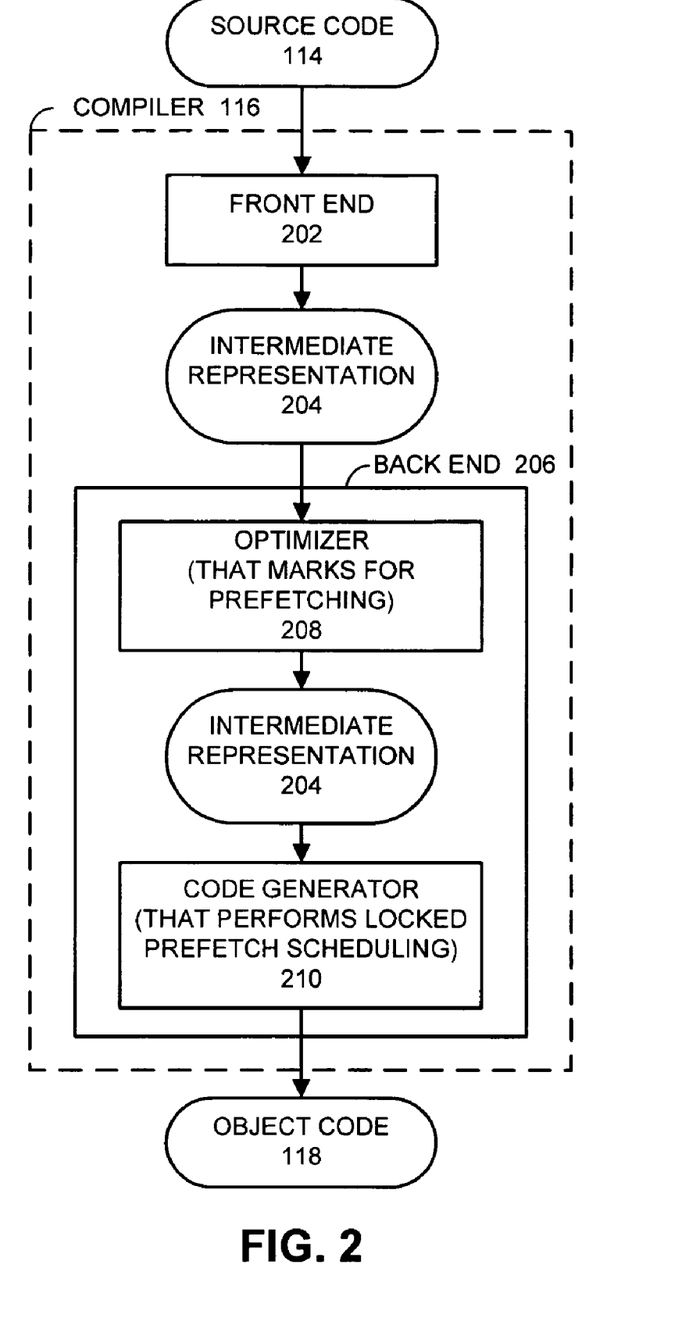
FIG. 2 illustrates a compiler in accordance with an embodiment of the present invention.

FIG. 2 illustrates the structure of compiler 116 in accordance with an embodiment of the present invention. Compiler 116 takes as input source code 114 and outputs executable code 118. Note that source code 114 may include any computer program written in a high-level programming language, such as the C programming language. Executable code 118 includes executable instructions for a specific virtual machine or a specific processor architecture.

Compiler 116 includes a number of components, including front end 202 and back end 206. Front end 202 takes in source code 114 and parses source code 114 to produce intermediate representation 204.

Intermediate representation 204 feeds into back end 206, which operates on intermediate representation 204 to produce executable code 118. During this process, intermediate representation 204 feeds through optimizer 208, which identifies and marks data references within the code as candidates for prefetching. The output of optimizer 208 feeds into code generator 210, which generates executable code 118. In doing so, code generator 210 inserts prefetch instructions and corresponding locks into the code in advance of associated data references.

Inserting Prefetch Instructions and Corresponding Locks

Figure 3:
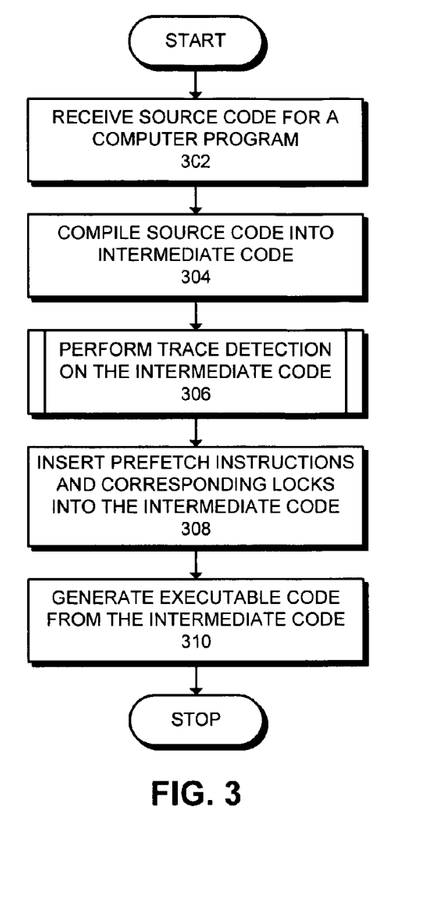
FIG. 3 presents a flowchart illustrating the process of inserting prefetch instructions and corresponding locks into code in accordance with an embodiment of the present invention.

FIG. 3 presents a flowchart illustrating the process of inserting prefetch instructions and corresponding locks into code in accordance with an embodiment of the present invention. The system starts when source code for a computer program is received (step 302). Next, the system compiles the source code into an intermediate code (step 304). The system then performs a trace detection on the intermediate code (step 306). This trace detection is described below in conjunction with FIG. 4.

After performing the trace detection, the system inserts prefetch instructions and corresponding locks into the intermediate code (step 308). Finally, the system generates executable code from the intermediate code (step 310).

Trace Detection

Figure 4:
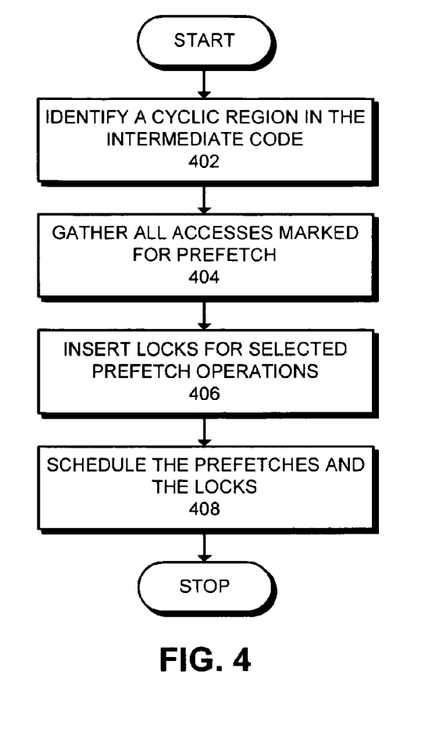
FIG. 4 presents a flowchart illustrating the process of performing a trace detection in accordance with an embodiment of the present invention.

FIG. 4 presents a flowchart illustrating the process of performing a trace detection in accordance with an embodiment of the present invention. The system starts by identifying a cyclic region in the intermediate code (step 402). This cyclic region can include structured program loop constructs, such as Fortran "DO" loops or C "for" loops, or a circular sequence of basic blocks that have a high probability of being executed repeatedly. Next, the system gathers all the accesses within the cyclic region that are marked for prefetch (step 404).

Next, the system inserts locks for selected prefetch operations (step 404). Note that where a given lock is inserted depends upon the size of the prefetch data structure as described below in conjunction with FIG. 5. Finally, the system schedules the prefetches and the corresponding locks (step 408).

Prefetches and Locks

Figure 5:
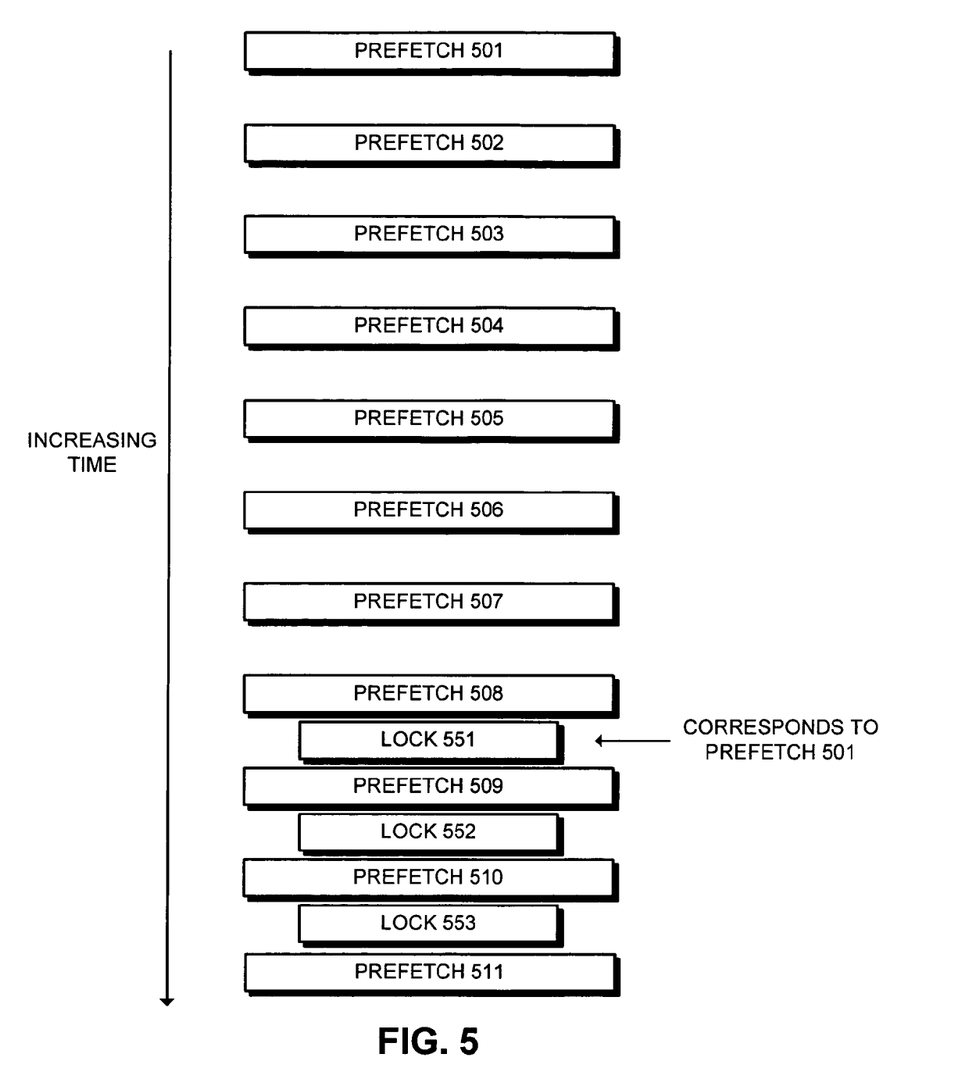
FIG. 5 illustrates prefetches and locks in accordance with an embodiment of the present invention.

FIG. 5 illustrates prefetches and locks in accordance with an embodiment of the present invention. The system illustrated in FIG. 5 can have up to eight outstanding prefetches at a given time. The prefetches are entered, in-order, starting with prefetch 501 through prefetch 508. The locks are inserted prior to subsequent prefetches. For example, lock 551 is inserted prior to prefetch 509 (which is eight prefetch instructions ahead of prefetch instruction 501, which it is associated with), lock 552 is inserted prior to prefetch 510, and lock 553 is inserted prior to prefetch 511.

Cyclic Nature of Prefetches and Locks

Figure 6:
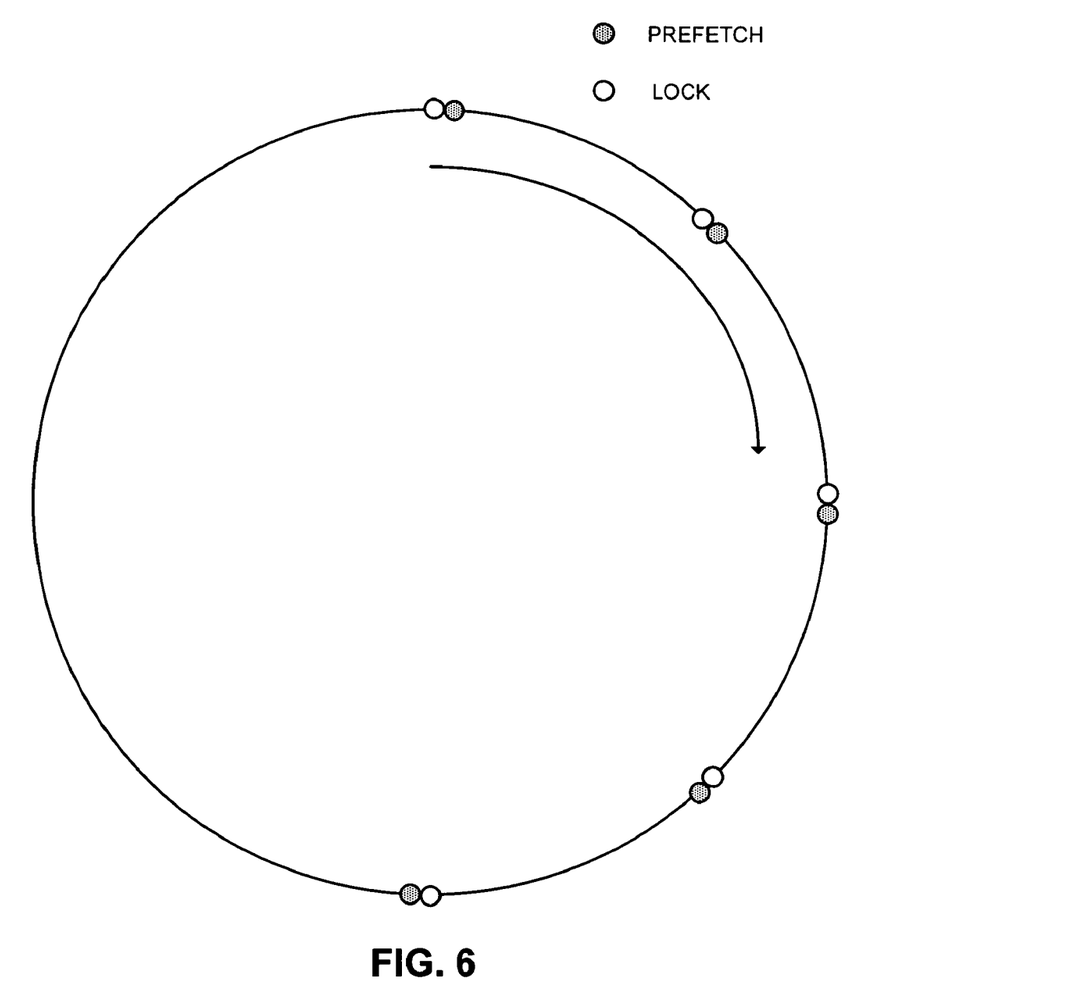
FIG. 6 illustrates the cyclic nature of prefetches and locks in accordance with an embodiment of the present invention.

FIG. 6 illustrates the cyclic nature of prefetches and locks in accordance with an embodiment of the present invention. Locks can be visualized as being shifted n steps around a wheel representing the cyclic region being targeted, with pieces of the main computation being scheduled between a prefetch and the next lock.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for locked prefetch scheduling in general cyclic regions of a computer program, comprising:
   receiving source code for the computer program;
   compiling the source code into intermediate code;
   performing a trace detection on the intermediate code to identify a cyclic region in the intermediate code;
   inserting prefetch instructions and corresponding locks into the intermediate code, wherein each prefetch instruction is paired with a lock, and wherein each lock is inserted a number of instructions after a corresponding prefetch instruction, wherein the number of instructions is computed based on at least one of a maximum number of outstanding prefetches allowed and a number of accesses in the cyclic region; and
   generating executable code from the intermediate code;
   wherein a lock for a given prefetch instruction prevents subsequent prefetches from being issued until the data value returns for the given prefetch instruction; and
   wherein the method is implemented by a computer system that comprises a processor and a memory.

2. The method of claim 1, wherein performing the trace detection involves:
   gathering all accesses marked for prefetching;
   inserting locks for selected prefetch operations; and
   scheduling the prefetches and the locks.

3. The method of claim 2, wherein identifying the cyclic region of the intermediate code involves locating general cyclic regions in the intermediate code that have a high probability of being executed repeatedly.

4. The method of claim 3, further comprising performing training runs to determine a probability of a region of the intermediate code being executed repeatedly.

5. The method of claim 1, wherein a lock for a given prefetch instruction is implemented as a non-faulting load instruction to the same address as the given prefetch instruction.

6. A computer-readable storage medium storing instructions that when executed by a computer cause the computer to perform a method for locked prefetch scheduling in general cyclic regions of a computer program, the method comprising:
   receiving source code for the computer program;
   compiling the source code into intermediate code;
   performing a trace detection on the intermediate code to identify a cyclic region in the intermediate code;

inserting prefetch instructions and corresponding locks into the intermediate code, wherein each prefetch instruction is paired with a lock, and wherein each lock is inserted a number of instructions after a corresponding prefetch instruction wherein the number of instructions is computed based on at least one of a maximum number of outstanding prefetches allowed and a number of accesses in the cyclic region; and generating executable code from the intermediate code;

wherein a lock for a given prefetch instruction prevents subsequent prefetches from being issued until the data value returns for the given prefetch instruction.

7. The computer-readable storage medium of claim 6, wherein performing the trace detection involves:

gathering all accesses marked for prefetching;

inserting locks for selected prefetch operations; and scheduling the prefetches and the locks.

8. The computer-readable storage medium of claim 7, wherein identifying the cyclic region of the intermediate code involves locating general cyclic regions in the intermediate code that have a high probability of being executed repeatedly.

9. The computer-readable storage medium of claim 8, the method further comprising performing training runs to determine a probability of a region of the intermediate code being executed repeatedly.

10. The computer-readable storage medium of claim 6, wherein a lock for a given prefetch instruction is implemented as a non-faulting load instruction to the same address as the given prefetch instruction.

11. A computer system for locked prefetch scheduling in general cyclic regions of a computer program, comprising:

a processor;

a memory;

a receiving mechanism configured to receive source code for the computer program;

a compiling mechanism configured to compile the source code into intermediate code;

a trace detection mechanism configured to perform a trace detection on the intermediate code;

an identifying mechanism configured to identify a cyclic region of the intermediate code;

an inserting mechanism configured to insert prefetch instructions and corresponding locks into the intermediate code, wherein each prefetch instruction is paired with a lock, and wherein each lock is inserted a number of instructions after a corresponding prefetch instruction, wherein the number of instructions is computed based on at least one of a maximum number of outstanding prefetches allowed and a number of accesses in the cyclic region; and a generating mechanism configured to generate executable code from the intermediate code;

wherein a lock for a given prefetch instruction prevents subsequent prefetches from being issued until the data value returns for the given prefetch instruction.

12. The computer system of claim 11, further comprising:

a gathering mechanism configured to gather all accesses marked for prefetching;

an inserting mechanism configured to insert locks for selected prefetch operations; and a scheduling mechanism configured to schedule the prefetches and the locks.

13. The computer system of claim 12, wherein identifying the cyclic region of the intermediate code involves locating general cyclic regions in the intermediate code that have a high probability of being executed repeatedly.

14. The computer system of claim 13, further comprising a training mechanism configured to perform training runs to determine a probability of a region of the intermediate code being executed repeatedly.

15. The computer system of claim 11, wherein a lock for a given prefetch instruction is implemented as a non-faulting load instruction to the same address as the given prefetch instruction.

\* \* \* \* \*